United States Patent
Loftus et al.

(10) Patent No.: US 6,844,857 B2
(45) Date of Patent: Jan. 18, 2005

(54) RETURNABLE ITEM FOR USE IN STORAGE AND TRANSPORTATION OF COMMERCIAL GOODS

(75) Inventors: Stephen Clive Loftus, Walsall (GB); Martin Cooper, Walsall (GB)

(73) Assignee: Linpac Mouldings Limited, Birmingham (GB)

( * ) Notice: Subject to any disclaimer, the term of this patent is extended or adjusted under 35 U.S.C. 154(b) by 0 days.

(21) Appl. No.: 10/220,799

(22) PCT Filed: Mar. 5, 2001

(86) PCT No.: PCT/GB01/00900
§ 371 (c)(1),
(2), (4) Date: Apr. 7, 2003

(87) PCT Pub. No.: WO01/67384
PCT Pub. Date: Sep. 13, 2001

(65) Prior Publication Data
US 2003/0179092 A1 Sep. 25, 2003

(30) Foreign Application Priority Data
Mar. 3, 2000 (GB) .............................................. 0005038

(51) Int. Cl.[7] ........................... G08B 13/14; H01Q 3/00
(52) U.S. Cl. ..................... 343/725; 340/572.7; 342/359
(58) Field of Search ................................ 343/725, 758, 343/753, 713, 795, 822; 340/572.7; 342/359

(56) References Cited

U.S. PATENT DOCUMENTS 5,995,048 A   11/1999  Smithgall et al.
6,023,242 A * 2/2000  Dixon ......................... 342/359
6,054,961 A * 4/2000  Gong et al. .................. 343/713
6,128,471 A * 10/2000 Quelch et al. ................. 455/25
6,400,321 B1 * 6/2002 Fenwick et al. ..... 343/700 MS
6,542,117 B1 * 4/2003  Broughton ................... 342/359

FOREIGN PATENT DOCUMENTS

| DE | 43 13 049 A | 10/1994 |
| EP | 0 635 305 A | 1/1995 |
| FR | 2 697 801 A | 5/1994 |
| FR | 2 772 529 A | 6/1999 |
| FR | 2 777 378 A | 10/1999 |
| WO | WO 99 65002 A | 12/1999 |
| WO | WO 00/05675 | 2/2000 |

\* cited by examiner

*Primary Examiner*—Don Wong
*Assistant Examiner*—Chuc Tran
(74) *Attorney, Agent, or Firm*—Adams Evans P.A.

(57) ABSTRACT

A container (10) (or other returnable item) for the storage and delivery of goods, comprises antenna means (16) for radio frequency use, and connection means (18) for receiving a removable drive circuit means (20). The drive circuit (20) is operable to communicate by means of the antenna (16) when connected therewith. The connections (18) serve, in use, to connect an installed drive circuit (20) with the antenna (16) to allow the drive circuit (20) to communicate. This allows the identity of the container or its contents to be communicated to a remote location.

15 Claims, 2 Drawing Sheets

RETURNABLE ITEM FOR USE IN STORAGE AND TRANSPORTATION OF COMMERCIAL GOODS

TECHNICAL FIELD AND BACKGROUND OF THE INVENTION

The present invention relates to returnable items for use in storage and transportation of commercial goods. In particular, but not exclusively, the invention relates to containers for use in the transportation and storage of commercial goods. Other types of returnable item include pallets, pallet boxes, dollies, trollies, stillages and the like.

Containers for commercial goods, such as for storage in a warehouse or delivery to retail premises, are commonly transported in groups, such as stacks of containers on a pallet, trolley, dolly or the like. These will be labelled, and inventory control will require that the labels are read to identify the contents, for instance as they leave a warehouse or are delivered to retail premises.

Various proposals have previously been suggested for facilitating the collection of this date. The present invention seeks to re-address this situation.

SUMMARY OF THE INVENTION

The invention provides a returnable item for use in storage and transportation of commercial goods, the item comprising RF antenna means and connection means for receiving removable drive circuit means operable to communicate by means of the antenna when connected therewith, the connection means serving, in use, to connect an installed drive circuit means with the antenna to allow the drive circuit means to communicate as aforesaid.

The connection means preferably comprises a location for receiving the drive circuit means, and electrical connection means associated with the location to provide electrical connection with the drive circuit means. Preferably the location comprises a recess for housing the drive circuit means. The recess may be formed to receive drive circuit means in the form of an integrated circuit. The location is preferably formed to receive and mechanically hold the drive circuit means.

Preferably the antenna means is permanently incorporated into the item. The item may be a moulded article, the antenna means being incorporated therein during moulding.

Preferably the antenna means comprises antenna portions formed to radiate primarily in a plurality of different directions, whereby to provide effective communication in at least those directions. The item is preferably a container. The item may comprise a generally rectangular base and upstanding walls, the antenna means comprising antenna portions incorporated in more than one wall or more than one of the base and walls.

Preferably the antenna portions together form a single antenna for connection with drive circuit means. Alternatively, the antenna portions may be each operable as an independent RF antenna connectable with drive circuit means independently of other antenna portions. The antenna means may be formed to be operable in a plurality of different frequency bands. The antenna means may comprise a plurality of antenna portions each tuned to a different frequency band and each independently connectable to drive circuit means by the connection means. Alternatively, the antenna means may comprise a single antenna portion resonant at a plurality of different frequency bands.

The invention also provides a returnable item for use in storage and transportation of commercial goods, the item comprising RF antenna means operable to provide communication between a drive circuit means associated with the item, and a remote location, the antenna means comprising antenna portions formed to radiate primarily in a plurality of different orientations, whereby to provide effective communication in at least those directions.

Preferably the item is a container which comprises a generally rectangular base and upstanding walls, the antenna means comprising antenna portions incorporated in more than one of the base and walls. The antenna portions may together form a single antenna for connection with drive circuit means. Alternatively, the antenna portions may be each operable as an independent RF antenna connectable with drive circuit means independently of other antenna portions.

Other features of returnable items according to the first aspect of the invention may be incorporated in an item according to this aspect of the invention.

The invention further provides a returnable item for use in storage and transportation of commercial goods, the item comprising RF antenna means operable to provide communication between a drive circuit means associated with the container, and a remote location, the antenna means being operable in a plurality of different frequency bands.

Preferably the antenna means comprises a plurality of antenna portions each tuned to a different frequency band and each independently connectable to drive circuit means by the connection means. Alternatively, the antenna means may comprise a single antenna portion resonant at a plurality of different frequency bands.

Features of items according to the first two aspects of the invention may be incorporated in an item according to this aspect of the invention.

BRIEF DESCRIPTION OF THE DRAWINGS

Embodiments of the present invention will now be described in more detail, by way of example only, and with reference to the accompanying drawings, in which.

DETAILED DESCRIPTION OF THE PREFERRED EMBODIMENT

Figure 1:
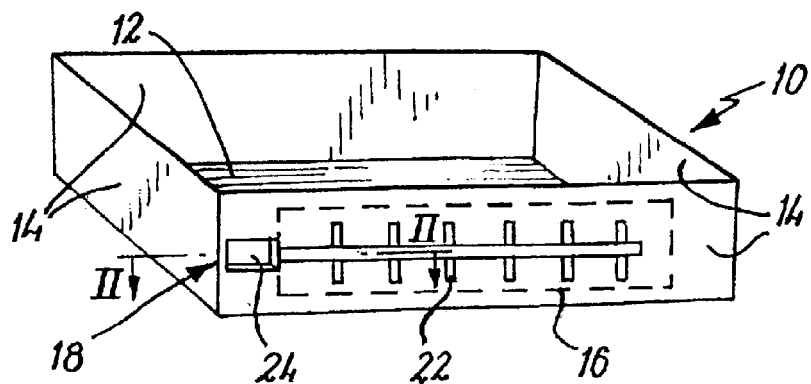
FIG. 1 is a highly schematic and part diagrammatic perspective view of a container according to the present invention.

FIG. 1 shows a container 10 which, in this example, has a generally rectangular base 12, from which four walls 14 are upstanding. The container 10 shown in the drawing is intended for commercial use for storage and delivery of retail products, for instance, and may therefore be provided with formations to allow containers to stack, nest or the like, with lids, and other features which are conventional in themselves. These features are within the expertise of the skilled man and are not described in detail herein.

In particular, the container is intended to be returnable, so that it may be sent out filled, and then returned empty for refilling and re-use.

Figure 2:
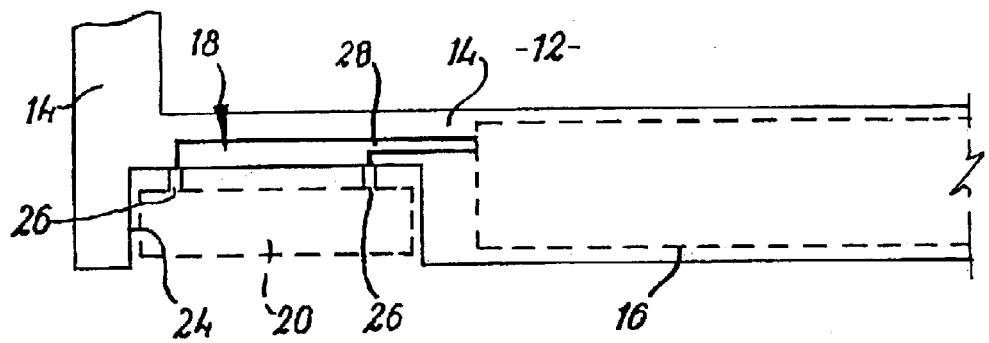
FIG. 2 is a partial horizontal section along the line II—II in FIG. 1.

In accordance with the invention, the container 10 comprises antenna means 16 for radio frequency (RF) use, and connection means indicated generally at 18 for receiving a removable drive circuit means 20 (FIG. 2). The drive circuit 20 is operable to communicate by means of the antenna 16 when connected therewith. The connections 18 serve, in use, to connect an installed drive circuit 20 with the antenna 16 to allow the drive circuit 20 to communicate in this manner.

In more detail, the container 10 is, in this example, a moulded plastics product. Conducting elements 22 are embedded within one wall of the container 10 during manufacture and are arranged to form the RF antenna 16. This lies within the plane of the wall 14 and is therefore ultimately limited in its size by the dimensions of the wall, although in practice, other features of the wall (particularly features required for stacking, nesting and the like) may impose additional limitations on the size or form of the antenna 16.

The connection means 18 are shown in more detail in FIG. 2. A recess 24 is formed in the wall 14. The recess 24 may be open to the outer face of the wall 14 or the interior of the container, and may be provided with a cover (not shown). Connectors 26 are provided within the recess 24 and are in electrical connection with conductors 28 embedded in the wall 14 to provide electrical connection between the connectors 26 and the conducting elements 22 of the antenna 16.

A drive circuit 20 can be removably installed in the position illustrated in FIG. 2, as follows. It is envisaged that the drive circuit 20 will be in the form of an integrated circuit "chip" having connecting terminals in the form of "legs" which can be pushed into the connectors 26 when the drive circuit 20 is installed. The connectors 26 then provide mechanical grip on the legs of the circuit 20, providing mechanical location to retain the circuit 20. The connectors 26 also provide electrical connection with the circuit 20, to complete the electrical connections between the circuit 20 and the antenna 16, thereby allowing the drive circuit 20 to use the antenna 16 for RF communication with a remote location.

It is envisaged that the drive circuit 20 may be passive, to respond to a signal received via the antenna 16 from an external source, and to respond in predetermined manner. Alternatively, the drive circuit 20 may be active, to initiate transmission using the antenna 16. In the latter case, a power supply, such as a battery, will be required or may be incorporated within the circuit 20.

It is envisaged that in use, the circuit 20, whether active or passive, will be able to report data relating to the container 10 when interrogated (in the case of a passive circuit) or spontaneously. In a simple arrangement, the circuit 20 may report its identity, from which the identity of the container in which it is installed may be obtained from appropriate records, and thus the contents of the container identified. Alternatively, the circuit 20 may identify the container to which it has been installed, or the contents of that container. In the latter case, some form of re-writeable memory could be used, together with a facility to change stored data. It is envisaged that the drive circuit 20 would be "loaded" with appropriate data at the time it is installed in the container 10. For instance, as the container 10 is loaded with produce, the circuit 20 can be "loaded" with corresponding data to identify the produce.

The removable nature of the circuit 20 allows it to be readily replaced. This may be necessary in the case of damage or malfunction. Alternatively, passive circuits 20 might have identification data permanently stored in them, allowing an appropriate circuit to be installed when a container is filled, to identify the contents. The circuit would then be removed when the container is emptied.

In addition, removable circuits allow alternative circuits to be installed (so long as they are compatible with the spatial requirements of the connectors 26). For instance, as technologies change and improve, circuits 20 can be updated. However, it is envisaged that RF antenna design is sufficiently well established that upgraded antennas are unlikely to be required within the expected life of a container.

Figure 3:
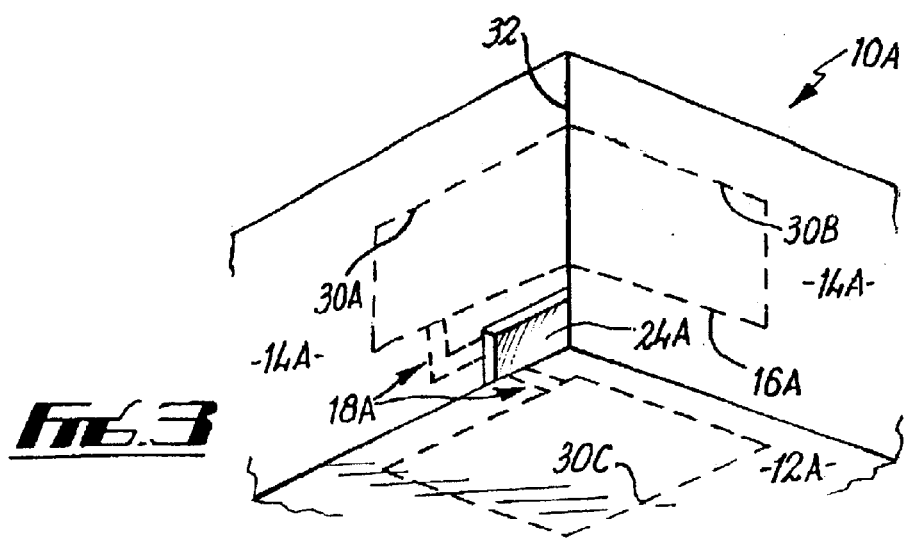
FIG. 3 is a view from below of a second embodiment of the invention.

FIG. 3 shows an alternative embodiment of container 10A, again having a base 12A, walls 14A and an antenna arrangement 16A embedded within the container during manufacture. In this example, the antenna 16A comprises several different antenna portions, as follows. A first antenna portion 30A and second portion 30B are within walls 14A which meet at an edge 32 Their location is illustrated by broken lines in FIG. 3. Detail of their construction is not shown. However, the conducting elements of the two portions 30A,30B are interconnected to form a single RF antenna having limbs which are generally perpendicular to each other, for reasons to be explained below.

A recess 24A is provided near the lower end of the edge 32, adjacent the base 32A, with connection means 18A for connecting a drive circuit (not shown) to the antenna portion 30A, and therefore to the portion 30B.

The third antenna portion 30C is located within the base 12A and is thus generally perpendicular to both portions 30A,30B. The portion 30C forms an independent antenna, separately connected to the recess 24A by connection means 18A and thus actuable by a drive circuit independently of actuation of the portions 30A,30B.

Figure 4:
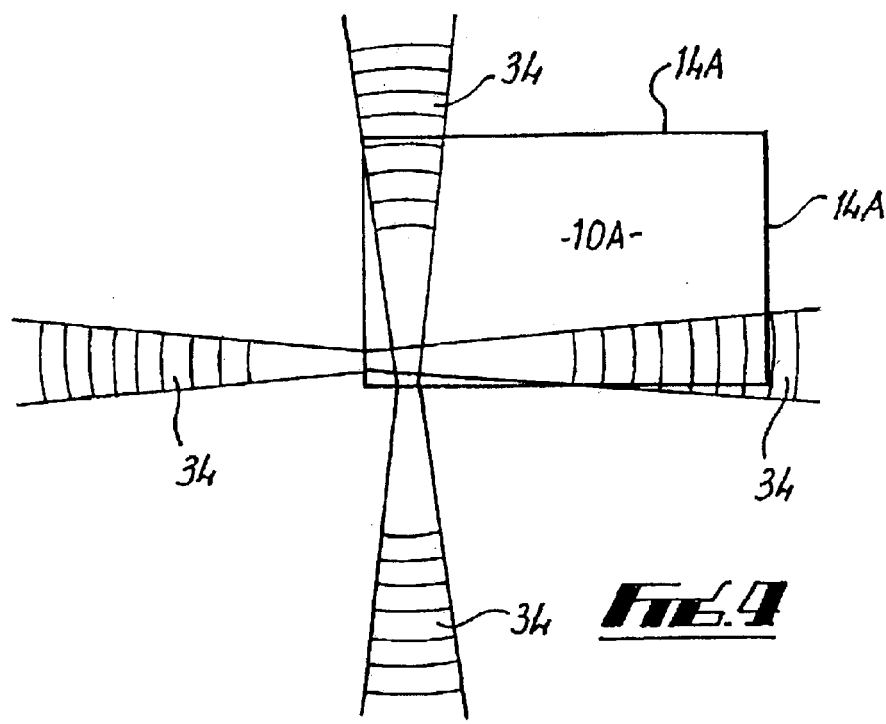
FIG. 4 is a highly diagrammatic plan view illustrating RF characteristics of the embodiment of FIG. 3.

The different orientations of the portions 30A,B,C will affect the directional nature of the RF communication available to a drive circuit 20. This is illustrated schematically in FIG. 4. If it is assumed that the antenna portions 30A,30B, 30C have a coverage pattern which is maximum in a direction generally perpendicular to the plane of the portions, then when viewed from above, the container 10A will have two perpendicular main directions of RF communication, as illustrated by the shaded areas 34. The portion 30C will contribute a similar, but vertically oriented pattern. Consequently, the combined coverage of the portions 30A,B,C includes all six orthogonal directions, relative to the container 10, so that it is envisaged that adequate communication can be established with substantially any point relative to the container. Thus, in an automated system, adequate communication with the circuit 20 can be maintained substantially regardless of the orientation of the container.

Figure 5:
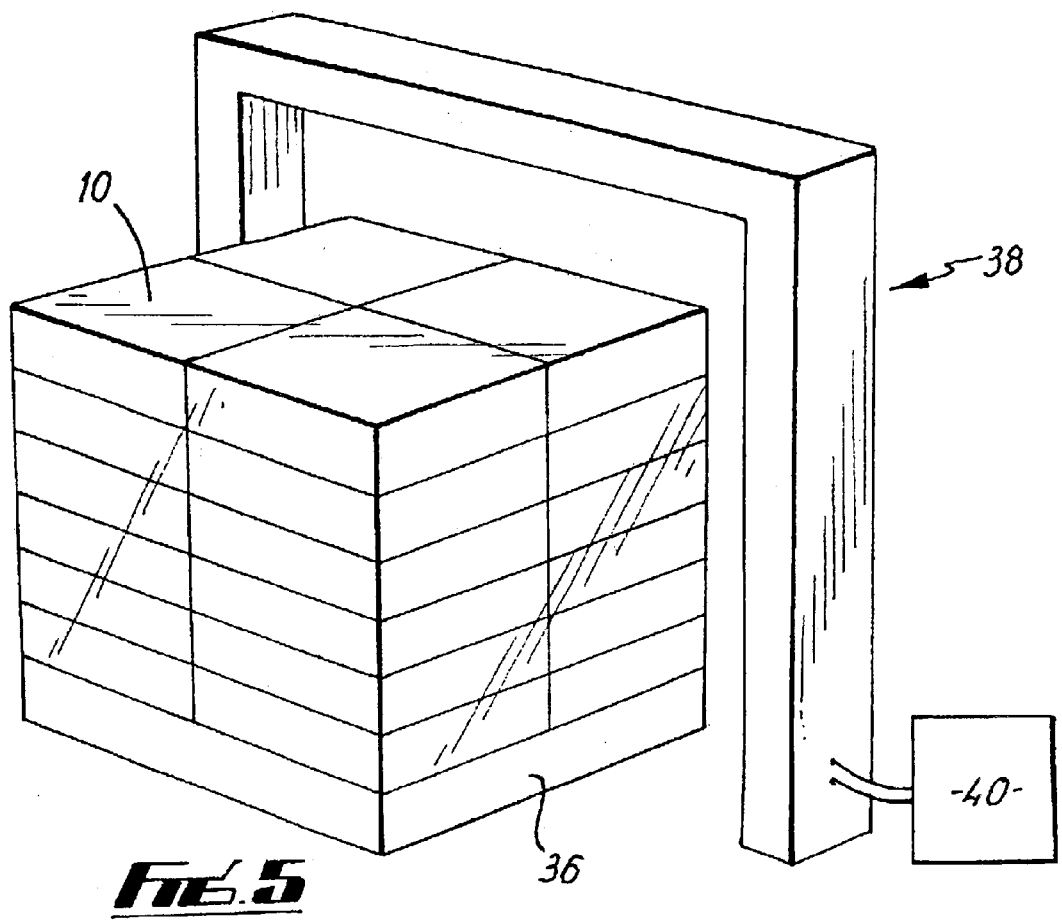
FIG. 5 illustrates schematically the manner in which the invention may be used.

An automated system which can take advantage of these features is illustrated in FIG. 5. This shows a pallet 36 on which a number of containers 10,10A are stacked. The pallet 36 is passing through an arch 38 which includes RF aerials connected to a system indicated at 40, such as a stock control system. As the pallet 36 moves through the arch 38, RF communication is established between the system 40 and the drive circuit 20 of each container on the pallet 36, by means of the antennas within the arch 38, and the antennas 16,16A incorporated in the containers 10,10A. Accordingly, the system 40 can identify each container and contents as the pallet 36 passes through the arch 38, so that inventory records, or the like, can be updated. It will be apparent that by providing antennas around the whole of the arch 38, together with containers having the radiation patterns described above in relation to FIG. 4, adequate communication between the system 40 and the circuits 20 can be expected substantially regardless of container orientation or pallet orientation as the pallet passes through the arch 38.

In this example, the system 40 may be active, to provide signals for interrogating the circuits 20, which may be passive. Alternatively, the circuits 20 may be active to provide signals which will be received by a passive system 40 when within range of the arch 38. Alternatively, both the system 40 and the circuits 20 could be active, to allow interaction as a container passes through the arch.

Returning now to FIG. 3, the description set out above has illustrated how two antenna portions with different orientations can together form a single antenna, whose radiation pattern will depend on the particular shape and form of the antenna portions, but will be more omni-directional than a simple plane antenna. In addition, FIG. 3 has indicated that several antenna portions could be independently available to a drive circuit installed in a container. The nature, layout and number of independent antenna portions are design criteria within the scope of the invention, to be chosen according to the intended application of the container and in particular, the nature and location of systems with which the circuits 20 will be required to communicate.

The description set out above has indicated that RF antenna design is unlikely to develop significantly during the expected lifetime of a typical container, but that technology associated with the circuits 20 might change more rapidly. The ability to upgrade a container by replacing the drive circuit is therefore important. It is also envisaged that as drive circuit technology improves, requirements may change in terms of the frequency of RF communication. It may therefore be desirable to build containers which incorporate several different antenna systems, each tuned to a different frequency band and independently connectable to a circuit 20 so that if a replacement circuit is designed to communicate by means of a different frequency band, the appropriate antenna can be selected from those available. Alternatively, an antenna incorporated in the container could be constructed in order to be resonant at more than one frequency band, such as by the use of traps, filters or other arrangements to electrically connect and disconnect conducting elements or parts, to change the electrical characteristics of the antenna. Many techniques of this nature are well known in the field of RF antenna design.

Many variations and modifications can be made to the apparatus described above, without departing from the scope of the present invention. In particular, many different antenna and drive circuit arrangements could be used, as discussed. Arrangements according to the invention could be incorporated into containers of many different shapes, sizes and forms.

The example described above is a container. Some returnable items for use in storage and transportation are given other names, such as pallets (on which a stack of containers is secured for easier handling), pallet boxes (large containers having pallet features in their base, for compatibility with pallet handling equipment), dollies and trollies (on which stack of containers can be wheeled around) and stillages (an open-sided pallet box used particularly in the automotive industry. Features of the type described above in relation to the drawings can be incorporated into any of these on other similar returnable items, either for identifying the goods being carried (for inventory control) or for identifying the items (for improved management of a fleet of returnable items).

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

What is claimed is:

1. A reusable storage and transport item for commercial goods, the item comprising RF antenna means, connection means and drive circuit means, the connection means being operable to provide connection between the antenna means and the drive circuit means, and the drive circuit means being operable to communicate by means of the antenna means when connected therewith, the connection means being further operable to selectively replaceably receive the drive circuit means to connect the drive circuit means with the antenna means to allow the drive circuit means to communicate as aforesaid, whereby the drive circuit means is removable and reconnectable by means of the connection means.

2. An item according to claim 1, in which the connection means comprises a location for receiving the drive circuit means, and electrical connection means associated with the location to provide electrical connection with the drive circuit means.

3. An item according to claim 2, in which the location comprises a recess for housing the drive circuit means.

4. An item according to claim 3, in which the recess is formed to receive drive circuit means in the form of an integrated circuit.

5. An item according to claim 1, in which the location is formed to receive and mechanically hold the drive circuit means.

6. An item according to claim 1, in which the antenna means is permanently incorporated into the item.

7. An item according to claim 6, in which the item is a moulded article, the antenna means being incorporated therein during moulding.

8. An item according to claim 1, in which the antenna means comprises antenna portions formed to radiate primarily in a plurality of different directions, whereby to provide effective communication in at least those directions.

9. An item according to claim 1, wherein the item is a container.

10. An item according to claim 9, wherein the container comprises a generally rectangular base and upstanding walls, the antenna means comprising antenna portions incorporated in more than one wall or more than one of the base and walls.

11. An item according to claim 10, in which the antenna portions together form a single antenna for connection with drive circuit means.

12. An item according to claim 10, in which the antenna portions are each operable as an independent RF antenna connectable with drive circuit means independently of other antenna portions.

13. An item according to claim 1, in which the antenna means is formed to be operable in a plurality of different frequency bands.

14. An item according to claim 13, in which the antenna means comprises a plurality of antenna portions each tuned to a different frequency band and each independently connectable to drive circuit means by the connection means.

15. An item according to claim 13, in which the antenna means comprises a single antenna portion resonant in a plurality of different frequency bands.

* * * * *